Feb. 24, 1953
A. H. KRAUSE
2,629,327
PISTON MOVEMENT CONTROL DEVICE
Filed Nov. 13, 1948
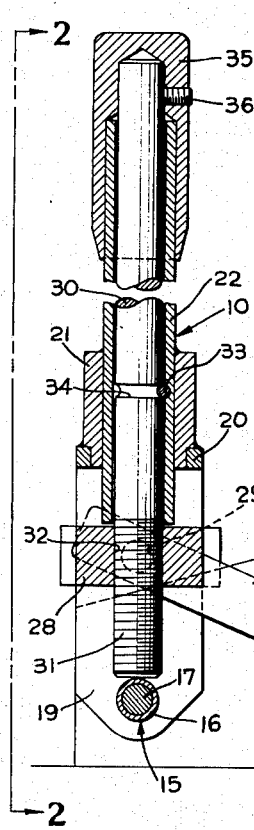
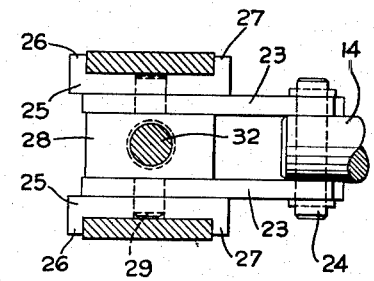
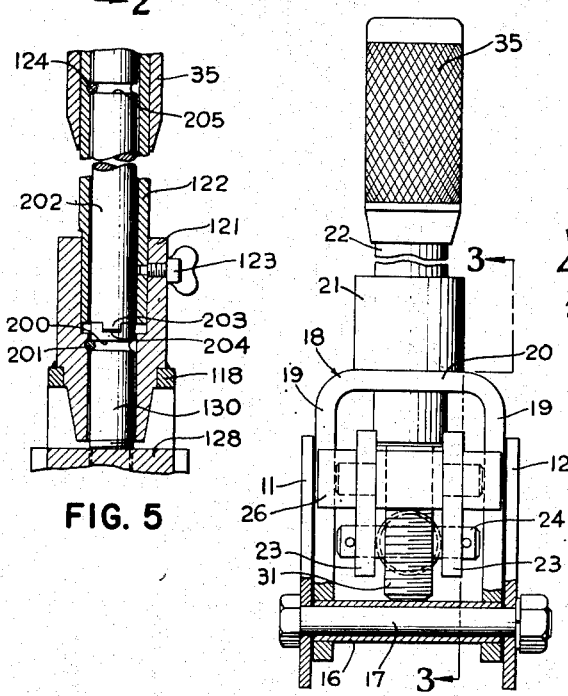
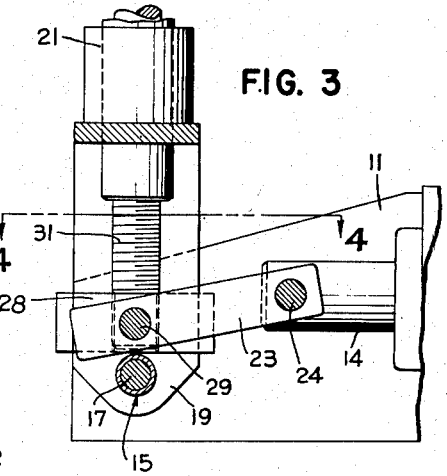
INVENTOR.
ALBERT H. KRAUSE
BY
West & Oldham
Attorneys Patented Feb. 24, 1953

2,629,327

UNITED STATES PATENT OFFICE 2,629,327

PISTON MOVEMENT CONTROL DEVICE

Albert H. Krause, East Cleveland, Ohio, assignor to The Carpenter Manufacturing Corporation, Cleveland, Ohio, a corporation of Ohio Application November 13, 1948, Serial No. 59,921

5 Claims. (Cl. 103—38)

This invention relates to piston movement control devices, especially to a handle or lever arm that is pivotally associated with a piston member for reciprocation of the piston by arcuate movement of the control handle.

The general object of the present invention is to provide a sturdy, adjustable piston control handle of novel construction.

Another object of the invention is to provide a piston control device whereby the action produced through movement of the device through a given arc can produce widely varying movement of an associated piston.

Another object of the invention is to provide a piston control device formed from a minimum of parts and one which is adapted to have a long service life with a minimum of maintenance.

A further object of the invention is to provide a device of the type indicated above with a removable handle or control member.

Yet another object of the invention is to provide a snugly positioned connector link and control block for effecting connection between a piston and an operating handle therefor.

The foregoing and other objects and advantages of the invention will become more apparent as the specification proceeds.

For a better understanding of the present invention, attention is directed to the accompanying drawings, wherein;

Fig. 1 is a side elevation, partly in vertical section, of a piston and control device embodying the principles of the invention;

Fig. 2 is an end elevation, partially broken away, taken on the line 2—2 of Fig. 1;

Fig. 3 is a vertical section taken on the line 3—3 of Fig. 2;

Fig. 4 is a horizontal section taken on the line 4—4 of Fig. 3; and

Fig. 5 is a fragmentary vertical section of a modification of the control device of the invention.

The piston control device of the invention is generally indicated by the numeral 10 and is shown in detail in the accompanying drawings. This device 10 includes a frame having two longitudinally extending plates 11 and 12 and a piston receiving cylinder 13 is suitably associated with or secured to the plates 11 and 12 with the cylinder being positioned intermediate such plates. This cylinder 13 may be of the type disclosed in Christenson Patent No. 2,410,808 although other cylinders and piston constructions may be substituted therefor, when desired. In all events, a suitable piston (not shown) is received in the cylinder 13 and has a piston rod 14 secured thereto with one end of such rod protruding from the cylinder 13.

In order to anchor a control handle for the piston rod 14 onto the device 10, a fulcrum pin 15 is secured in a fixed position in the device 10. This pin 15 is shown as including a tube 16 through which a bolt 17 extends with the bolt 17 being secured between the frame plates 11 and 12. A yoke 18 which has two parallel arms 19 extending from a base portion 20 thereof is pivotally carried by the fulcrum pin 15 with the free ends of the yoke arms 19 being secured thereto in any conventional manner. The yoke 18 has a sleeve 21 secured to the base 20 thereof and extending outwardly therefrom in a direction oppositely to the direction that the arms 19 extend from such base. This sleeve 21 usually is welded to the yoke 18 and protrudes only a short distance therefrom. The sleeve 21 also positions a tubular member 22 which protrudes from the sleeve 21 an appreciable distance at both ends thereof and with the inner end of such member 22 normally protruding through the base 20 of the yoke.

A pair of links 23 is pivotally secured to the exposed end of the piston rod 14 by a pin 24 with one link being located adjacent each of two diametrically opposed portions of the piston rod. These links 23 are connected in a vertically adjustable manner to the yoke 18 for varying the piston stroke upon movement of the yoke 18 through a predetermined limited arcuate movement. These connecting means are shown as comprising a slide block 25 which is engaged with each of the arms 19 with each block 25 having a pair of laterally protruding portions 26 and 27 that snugly engage with the sides of the arms 19. Thus the slide blocks 25 are carried by the arms 19 and may be moved vertically thereof whereas any relative movement transversely of the arms 19 by the blocks 25 is prevented by the portions 26 and 27 of blocks 25. The slide blocks 25 and the links 23 connect to a control block 28 which has a pin or stud shaft 29 extending from each of two opposed portions of such block 28. Each pin 29 extends through a link 23 and into a seating recess or socket provided in each block 25 whereby movement of the slide blocks is unified and such slide blocks control the position of the links 23 with relation to the piston rod 14 due to such links 23 being connected adjacent its ends between the pins 24 and 29.

The vertical position of the control block 28 is determined by means of a control rod 30 which is received within the tubular member 22 and it extends therefrom at both ends. The lower end of the control rod is threaded as at 31 and it engages with a tapped hole 32 formed in the center portion of the control block 28. Any suitable means, such as a pin 33 is positioned in the sleeve 21 and extends radially therethrough a sufficient distance to engage with a circumferentially extending recess 34 formed in the outer periphery of the control rod 30 so that such pin 33 prevents relative longitudinal movement between the sleeve 21, or tubular member 22, and the control rod 30. However, relative rotational movement between such members is still permitted. Thus, by rotating the control rod 30, the vertical position of the slide blocks 25 can be varied by movement of the control block 28 and the effective stroke produced on the piston rod 14 may be changed within desired predetermined limits.

Usually some type of a grip device or handle is provided for the outer or upper end of the control rod 30 and a tubular handle 35 is shown secured to this portion of the rod 30 by means of a set screw 36. Fig. 1 of the drawings best shows that the tubular handle 35 may also encompass a portion of the tubular member 22 but, of course, the handle 35 will be rotatable with relation to such member.

A modified form of the control device of the invention is shown in Fig. 5 and it includes a yoke 118 that has a sleeve 121 secured thereto and extending therefrom in both directions from the base of the yoke. In this instance, a lower section 130 of the control rod is provided and is engaged with a tapped hole in a control block 128. The control rod section 130 has a circumferentially extending recess 200 formed in its periphery and a set screw 201 or other similar locking member is engaged with the sleeve 121 and is received in a portion of the recess 200 to permit relative rotational movement between such members while retaining them in given longitudinal relationship.

A second portion of the control rod is provided and such control rod section 202 has a tongue 203 formed thereon for engagement with a recess 204 provided in the end of the section 130 whereby the control rod sections are longitudinally abutted and torsional forces are transmitted therebetween. A tubular member 122 is positioned around the control rod section 202 and it extends axially within the sleeve 121. The tubular member 122 is removably secured to the sleeve 121 by a set screw 123 or similar member whereby a removable handle member is provided for this embodiment of the invention. Since the tubular member 122 and control rod section 202 may be of appreciable length, this construction permits the operating handle to be removed from the pump control device when same is not to be operated. Again, a set screw 124, or equivalent, is engaged with the tubular member 122 and protrudes into a portion of a recess 205 formed in the periphery of the section 202 to retain such members in a fixed longitudinal relationship.

From the foregoing, it will be seen that a fixed pivot or fulcrum member is provided in the apparatus and that the position of an operating handle is determined by such fixed or fulcrum member. Means are provided for adjusting the position of a connector link extending between the operating handle and a piston member whereby the effective throw of the operating handle can be varied, as desired, within the adjustment limits of the apparatus.

In the drawings, Fig. 3 shows the control block being positioned at its lower extremity of movement whereas the other views of the drawing show such block 28 at its uppermost position. It will be realized that the slide blocks and control block function as a unit and that in some instances it may even be desirable to have such blocks formed as a unit which engages with one end portion of a link that connects to the piston. Likewise, the link may extend directly to the piston rather than connecting to a piston rod.

From the foregoing it should be apparent that an adjustable handle or control device has been provided for regulating the stroke of a piston produced by uniform movement of the control handle through a predetermined arc.

It also will be noted that as the slide block 28 moves down closer to the fulcrum 15, the force set up on the links 23 will be increased. Thus the lowermost position of the block 28 is substantially in alignment with the longitudinal axis of the piston rod 14 whereas the upper position of the slide block has the link 23 extending at a greater angle of inclination with relation to the axis of the piston rod. Such a positioning of the elements of the invention facilitates transfer of the force to the piston rod. Also a greater length stroke of the piston rod is produced when the block 28 is at its uppermost position so that a maximum volume will be pumped in the cylinder 13 when relatively low pressures are being supplied thereto and this volume of material pumped decreases as the pressure thereon increases. By use of the tubular handle 35, force is transmitted directly from it to the tubular member 22 and then to the sleeve 21 and yoke 18. As the control rod 30 is freely received within the tubular member 22, the control rod has no pumping forces set up thereon whereby adjustment of the position of the slide block 28 is facilitated since the control rod cannot be deformed by operating pressures. Likewise, it should be noted that the links 23 extend the width or depth of the control block 28 to provide for solid positioning of such links and the blocks with which they are associated.

While two complete embodiments of the invention have been disclosed herein, it will be appreciated that modification of these particular embodiments of the invention may be resorted to without departing from the scope of the invention as defined by the appended claims.

Having thus described my invention, what I claim is:

1. A piston control device comprisng a frame, a cylinder secured to said frame, a piston secured in said cylinder, a piston rod secured to said piston and extending from said cylinder, a fulcrum pin secured to said frame adjacent the end of said piston rod but spaced longitudinally outwardly of said frame from said rod, a yoke having a base and parallel arms extending therefrom with such arms pivotally engaged with said fulcrum pin, a tubular member secured to the base of said yoke and extending outwardly from same along the longitudinal centerline of said yoke in a direction oppositely from said arms, a slide block slidably engaged with each arm of said yoke for movement therealong, a link pivotally connected to the end of said piston rod, a control block pivotally engaged with one portion of said link and engaged with and extending between said slide blocks, a control rod having a threaded lower portion positioned in said tubular member and extending therefrom at each end, said control rod extending through the base of said yoke and having the threaded portion thereof engaged with said control block, said control rod being the operating handle for moving said piston, a handle member secured to said control rod at the end thereof remote from said yoke, and means securing said control rod to said tubular member to prevent relative longitudinal movement thereof and to permit rotational movement of said control rod whereby the position of said slide blocks on said yoke and the position and action of said link can be varied by rotation of said handle member.

2. A device as in claim 1 wherein said slide blocks each has side portions snugly engaging the lateral edges of the arms of said yoke, a pair of links are provided, and said control block has pin means extending from opposite portions of same and with each pin means engaging with one of said links and one slide block.

3. A piston control device comprising a frame having a piston cylinder therein, a piston in said cylinder, a piston rod secured to said piston and extending from said cylinder, a fulcrum pin secured to said frame adjacent the end of said piston rod but spaced longitudinally outwardly of said frame from said rod, a yoke having a base and arms extending therefrom with such arms pivotally engaged with said fulcrum pin, a tubular member secured to said yoke and extending outwardly from same along the longitudinal centerline of said yoke oppositely from said arms, a slide block slidably engaged with each arm of said yoke for movement therealong, a link pivotally connected to the end of said piston rod, a control block pivotally engaged with one portion of said link and engaged with and extending between said slide blocks, a control rod having a threaded lower portion positioned in said tubular member and extending therefrom at each end, said control rod having the threaded portion thereof engaged with said control block, a handle member secured to said control rod at the end thereof remote from said yoke, and means securing said control rod to said tubular member to prevent relative longitudinal movement thereof and to permit rotational movement of said control rod.

4. A piston control device comprising a fulcrum pin, a yoke having a base and parallel arms extending therefrom with such arms pivotally engaged with said fulcrum pin, a tubular member secured to the base of said yoke and extending outwardly from the longitudinal centerline of said yoke oppositely to the arms thereof, a slide block slidably engaged with each arm of said yoke for movement therealong, a link one portion of which is adapted to be pivotally connected to a piston, a control block pivotally engaged with a second portion of said link and engaged with and extending between said slide blocks, a control rod having a threaded lower portion positioned in said tubular member and extending therefrom at each end, said control rod extending through the base of said yoke and having the threaded portion thereof engaged with a tapped hole in said control block, said control rod being an operating handle for moving a piston, and means securing said control rod to said tubular member to prevent relative longitudinal movement thereof and to permit rotational movement of said control rod whereby the position of said slide blocks on said yoke can be varied to change the position and action of said link.

5. A device as in claim 4 wherein said control rod is formed in two longitudinally abutted sections with the abutting ends adapted to engage removably with each other, said tubular member extends over the joint formed in said control rod, a second tubular member is positioned over the said control rod and overlaps the end of said tubular member and extends to a point spaced longitudinally inwardly of the end of such rod, and means are provided for removably securing said tubular members together.

ALBERT H. KRAUSE.

REFERENCES CITED

The following references are of record in the file of this patent:

UNITED STATES PATENTS

| Number | Name | Date |
|---|---|---|
| 1,937,471 | Dean et al. | Nov. 28, 1933 |
| 2,108,311 | Harris | Feb. 15, 1938 |
| 2,197,730 | Mugford | Apr. 16, 1940 |
| 2,240,371 | Linch et al. | Apr. 29, 1941 |
| 2,259,587 | Rush | Oct. 21, 1941 |